United States Patent
Albite

(10) Patent No.: US 9,756,948 B1
(45) Date of Patent: Sep. 12, 2017

(54) DISPOSABLE ARM REST COVER

(71) Applicant: Vitacell Inc., Miami, FL (US)

(72) Inventor: Pedro Albite, Miami, FL (US)

(73) Assignee: Vitacell Inc., Miami, FL (US)

( * ) Notice: Subject to any disclaimer, the term of this patent is extended or adjusted under 35 U.S.C. 154(b) by 10 days.

(21) Appl. No.: 14/965,431

(22) Filed: Dec. 10, 2015

(51) Int. Cl.
- A47C 31/00 (2006.01)
- A47C 7/62 (2006.01)
- A47C 7/54 (2006.01)
- B64D 11/06 (2006.01)
- A47C 7/02 (2006.01)
- A47C 31/11 (2006.01)

(52) U.S. Cl.
CPC .............. *A47C 7/62* (2013.01); *A47C 7/54* (2013.01); *A47C 7/021* (2013.01); *A47C 7/546* (2013.01); *A47C 31/00* (2013.01); *A47C 31/11* (2013.01); *B64D 11/0646* (2014.12)

(58) Field of Classification Search
CPC ......... A47C 7/021; A47C 7/546; A47C 31/11; A47C 31/00; A47C 7/62; A47C 7/54; B64D 11/0646
USPC ........... 297/227, 229, 228.1, 228.11, 228.12, 297/219.1
See application file for complete search history.

(56) References Cited

U.S. PATENT DOCUMENTS

| | | |
|---|---|---|
| 2,057,551 A | 10/1936 | Bishop |
| 2,842,189 A | 7/1958 | Graft |
| D243,304 S | 2/1977 | Fuqua |
| 5,332,288 A * | 7/1994 | Coates ................. B60N 2/4673 296/153 |
| 5,505,412 A * | 4/1996 | Van Hamme .......... A47C 7/546 248/118 |
| 5,605,374 A | 2/1997 | Perry |
| 5,797,655 A * | 8/1998 | Miles ..................... A47C 7/546 248/118 |
| 5,979,987 A * | 11/1999 | Rich ..................... B60N 2/4626 297/188.18 |
| 6,827,405 B1 * | 12/2004 | Roberts .................. A47C 7/546 297/188.18 |
| D503,301 S | 3/2005 | Burch |
| 6,957,866 B1 * | 10/2005 | Cai ........................... A47C 1/03 297/411.35 |
| 7,246,851 B1 | 7/2007 | Phillips |

(Continued)

FOREIGN PATENT DOCUMENTS

| | | |
|---|---|---|
| CA | 2553942 A1 | 1/2008 |
| CN | 2647294 Y | 10/2014 |

*Primary Examiner* — Chi Q Nguyen
(74) *Attorney, Agent, or Firm* — Albert Bordas, P.A.

(57) ABSTRACT

A disposable armrest cover, having a top wall section with a top wall with a forward edge, an aft edge, and first and second lateral edges. The top wall further has perforations disposed at a first predetermined distance from the forward edge without reaching the aft edge. A first sidewall section has a first sidewall having a first sidewall forward edge, a first sidewall aft edge, and a first sidewall bottom edge. A second sidewall section has a second sidewall having a second sidewall forward edge, a second sidewall aft edge, and a second sidewall bottom edge. A forward wall section has a forward wall having a bottom edge. A strap assembly secures onto a chair having at least one armrest. In a preferred embodiment, the perforations form an "X" configuration.

16 Claims, 4 Drawing Sheets

(56) References Cited

U.S. PATENT DOCUMENTS

| | | | |
|---|---|---|---|
| 7,431,396 B1* | 10/2008 | Dasso | A47C 7/546 |
| | | | 297/227 |
| D675,857 S | 2/2013 | Eshom | |
| 8,733,837 B2 | 5/2014 | Weinstein et al. | |
| D711,162 S | 8/2014 | Wilson et al. | |
| 2002/0130538 A1* | 9/2002 | Artsvelyan | B60N 2/4673 |
| | | | 297/227 |
| 2006/0055215 A1* | 3/2006 | Potosky | A47D 13/083 |
| | | | 297/219.1 |
| 2006/0138820 A1* | 6/2006 | Riley | A47C 31/11 |
| | | | 297/228.1 |
| 2007/0013214 A1* | 1/2007 | Pope | A47C 7/68 |
| | | | 297/188.14 |
| 2007/0246980 A1 | 10/2007 | Bullocks | |
| 2009/0295206 A1 | 12/2009 | Charles et al. | |
| 2009/0315381 A1* | 12/2009 | Longnecker | B60N 2/4673 |
| | | | 297/411.23 |
| 2010/0117415 A1* | 5/2010 | Goetsch | A47C 27/086 |
| | | | 297/227 |
| 2010/0140994 A1 | 6/2010 | Moore | |
| 2011/0198904 A1 | 8/2011 | Thomas et al. | |
| 2013/0127217 A1* | 5/2013 | Goetsch | A47C 27/086 |
| | | | 297/227 |
| 2013/0320720 A1 | 12/2013 | Steinmetz | |
| 2013/0341979 A1 | 12/2013 | Girard | |
| 2016/0016496 A1* | 1/2016 | Lacey | B60N 2/60 |
| | | | 297/220 |
| 2016/0113412 A1* | 4/2016 | Clark | A47C 31/11 |
| | | | 297/227 |

\* cited by examiner

DISPOSABLE ARM REST COVER

BACKGROUND OF THE INVENTION

1. Field of the Invention

The present invention relates to hygienic protection, and more particularly, to disposable armrest covers.

2. Description of the Related Art

Applicant believes that one of the closest references corresponds to U.S. Patent Application Publication No. US 20130341979 A1, published on Dec. 26, 2013 to Jonathan Girard for a portable airplane armrest cushion. However, it differs from the present invention because Girard teaches a portable cushion device for temporary attachment to an airplane armrest structure or a passenger's arm. The portable cushion device is comprised of a base, a cushion positioned atop of said base, an antimicrobial cover covering all or a substantial portion of said base and said cushion, and a plurality of elastic straps attached to said base and capable of encircling an airplane armrest without unduly interfering with passenger controls that may be located on said airplane armrest.

Applicant believes that another reference corresponds to U.S. Patent Application Publication No. US 20130320720 A1, published on Dec. 5, 2013 to Mary D. Steinmetz for a disposable protective seating cover for promotion and advertising. However, it differs from the present invention because Steinmetz teaches a form-fitting protective seating cover which protects seating features, such as headrests, backs and chair surfaces, which includes surfaces for the display of promotions and advertising content, in which the seating cover is structurally designed for numerous types of row-based seating arrangements to take advantage of these unique properties.

Applicant believes that another reference corresponds to U.S. Patent Application Publication No. US 20110198904 A1, published on Aug. 18, 2011 to Thomas; et al. for an impervious wheelchair seat cover system. However, it differs from the present invention because Thomas; et al. teaches an impervious wheelchair seat cover used to substantially ensure that every patient or individual that is transported through a facility has a clean and sanitary wheelchair. The impervious wheelchair seat cover comprises a seat cover made from impervious materials and cut so that the impervious wheelchair seat cover lines a seat portion, a back portion and an arm portion of the wheelchair. The top and bottom corners have hook and loop fastener securing ties to hold the impervious wheelchair seat cover in place. There also are numerous pieces of adhesive material on the underside of the impervious wheelchair seat cover providing further cohesion to the chair. The arm covers are designed so as not to cover the sides of the wheelchair chair and to accommodate urine bags and other medical attachments. The impervious wheelchair seat cover is disposable or is washable and reusable.

Applicant believes that another reference corresponds to U.S. Patent Application Publication No. US 20100140994 A1, published on Jun. 10, 2010 to Adrienne Moore for a seat cover system. However, it differs from the present invention because Moore teaches a cover system for a seat having a base, a back, armrests and a tray. The cover system includes a main cover with a bottom portion extending across the base of the seat and a top portion extending across and over the back of the seat. The cover system further includes first and second armrest covers defining an open end opposing a closed end. The first and second armrest covers extend over the armrests of the seat with the closed ends thereof abutting outwardly facing ends of the armrests. The cover system also includes tray cover adapted to extend over the tray of the seat. The tray cover has at least first and second securing components extending from opposite sides thereof. The first and second securing members secure the tray cover relative to the tray of the seat.

Applicant believes that another reference corresponds to U.S. Patent Application Publication No. US 20090295206 A1, published on Dec. 3, 2009 to Charles; et al. for covers for arms of patio furniture. However, it differs from the present invention because Charles; et al. teaches a washable terry cloth cover for the arms of outdoor patio furniture/chairs. A washable terry cloth cover for the arms of outdoor patio furniture/chairs comprised of Velcro, a hook and loop fastener, sewn onto the terry cloth, so that it does not slip off the arm of the furniture. A washable terry cloth cover for the arms of outdoor patio furniture/chairs comprises strips of Velcro, a hook and loop fastener, sewn onto the terry cloth cover allowing the covers to achieve their objective because the terry cloth wraps around the arm of the furniture forming "sleeve" as it is secured under the arms of the furniture by the Velcro sewn onto the terry cloth, so that it does not slip off the arm of the furniture and, as such, the resulting terry cloth "sleeve" covering the arm of the furniture prevents skin contact with the bare, sun exposed material, often metal, of the furniture, thereby preventing the users skin from being burned.

Applicant believes that another reference corresponds to U.S. Patent Application Publication No. US 20070246980 A1, published on Oct. 25, 2007 to Sara E. Bullocks for a phlebotomists chair cover. However, it differs from the present invention because Bullocks teaches a disposable cover for a phlebotomists chair including a covering, wherein the covering is adapted to cover a portion of the phlebotomists chair. The covering also comprises a peripheral edge and an attachment member comprising a band of material generally disposed along at least a portion of the peripheral edge of the covering. The attachment member retains the covering over the portion of the phlebotomists chair.

Applicant believes that another reference corresponds to U.S. Pat. No. 8,733,837 B2 issued to Weinstein, et al. on May 27, 2014 for a furniture cover. However, it differs from the present invention because Weinstein, et al. teaches a furniture cover that has a substantially t-shaped, substantially continuous, fabric body having a generally elongated central trunk portion, and two outwardly extending arm portions. The central trunk portion is sized to extend over and substantially across the back, seat and front of a seating device. The arm portions are sized to extend over and substantially across the arms of the seating device. The fabric body has a first layer of comfort fabric for exposure to the user; and a second layer of waterproof fabric, seamed around a perimeter edge to the first layer, so that the second layer provides a waterproof barrier across the covered portions of the seating device.

Applicant believes that another reference corresponds to U.S. Pat. No. 7,246,851 B1 issued to Glenda J. Phillips on Jul. 24, 2007 for a vehicular armrest cover. However, it differs from the present invention because Phillips teaches an armrest cover that is slipped over an armrest within a vehicle in order to aesthetically cover the armrest with a desired design. An elongate cover member has a closed first end and a second end with an opening, the opening located either on a longitudinal axis of the cover member or radially offset from the longitudinal axis. The armrest passes through the opening and the cover member is slipped over the armrest until it is in substantially covering relationship with the armrest. The cover member may be made from an elastic material such as a nylon-spandex mix.

Applicant believes that another reference corresponds to U.S. Pat. No. 5,605,374 A issued to Mary O. Perry on Feb. 25, 1997 for an adjustable padded armrest. However, it differs from the present invention because Perry teaches an adjustable padded armrest cushion for removable attachment to the arm of a chair. The cushion comprises: a sack having a foam cushion therein, the sack being closed by stitching around its perimeter, thereby defining a pair of opposing marginal side edges; and, a pair of elongated rings, a pair of short bands securing the elongated rings to one of the opposing side edges of the sack, and a second pair of longer bands attached to the opposing side edge opposite the short bands, the long bands have hook and loop fasteners on one surface such that when the long bands are inserted through the elongated rings and folded back upon themselves, the fasteners secure the long bands in place and secure the sack to the arm of the chair. The bottom of the sack is split down its middle into two overlapping portions of about equal size to allow the pad to be easily removed from and inserted into the sack.

Applicant believes that another reference corresponds to U.S. Pat. No. 2,842,189 A issued to B. H. Gratt on Jul. 8, 1958 for a protective cover for furniture. However, it differs from the present invention because Gratt teaches a protective cover for furniture comprising an arm-rest cover being mounted on a roller, which in turn is secured to a chair frame by means of a bracket.

Applicant believes that another reference corresponds to U.S. Pat. No. 2,057,551 A issued to G. E. Bishop on Oct. 13, 1936 for a cover for dental chairs. However, it differs from the present invention because Bishop teaches a cover for dental chairs including arm covers being of channel-shaped construction, provided with a trim consisting of a peripheral leatherette binding. To hold the arm covers from sliding rearwardly on the chair arm, end caps are provided of hooded formation and formed of leatherette or other suitable material. The arm cover is of a construction having a peripheral leatherette binding, a leatherette wear-resisting hooded end cap for said member having an extended marginal portion secured to said member, and means for removably fastening the cover to the chair arm.

Applicant believes that another reference corresponds to U.S. Pat. No. D711162 S issued to Wilson, et al. on Aug. 19, 2014 for the ornamental design for a cap and armrest cover. However, it differs from the present invention because Wilson, et al. teaches a different design.

Applicant believes that another reference corresponds to U.S. Pat. No. D675857 S issued to Colleen M. Eshom on Feb. 12, 2013 for the ornamental design for an armrest cover. However, it differs from the present invention because Eshom teaches a different design.

Applicant believes that another reference corresponds to U.S. Pat. No. D503301 S issued to Emily H Burch; on Mar. 29, 2005 for the ornamental design for a removable self-gripping plastic auxiliary armrest for a chair. However, it differs from the present invention because Burch teaches a different design.

Applicant believes that another reference corresponds to U.S. Pat. No. D243304 S issued to Robert S. Fuqua on Feb. 8, 1977 for the ornamental design of an armrest cover. However, it differs from the present invention because Fuqua teaches a different design.

Applicant believes that another reference corresponds to Canadian Patent No. CA 2553942 A1 issued to Elaine A. Wood on Jan. 26, 2008 for a wheelchair sanitary cover protection set. However, it differs from the present invention because Wood teaches a protective covering package designed to protect wheelchair upholstery from fissures, cracks and damage. These covers were designed to protect wheelchair patients from bacteria and germ transferal, thus decreasing the spread of infectious disease. The main components consist of separate covers for armrests, kneepads, seat and back section of the wheelchair. Each individual covering piece can be replace readily if soiled, without having to change the complete covering package. These covers can be washed, disinfected, and dried commercially. The 3-ply fabric used for these covers consist of a comfortable woven, cotton blend outer layers and an inner layer of moisture proof barrier, to decrease the possibility of soiling the hard surfaces of the wheelchair.

Applicant believes that another reference corresponds to Chinese Patent No. CN 2647294 Y issued to Chen Hong et al. on Oct. 13, 2014 for a disposable cover for dental chair. However, it differs from the present invention because Chen Hong et al. teaches a disposable chair cover for a tooth operation chair, including a chair cover, a pillow cover, a head cover and two arm cover; wherein, each part consists of a cover and a fastening element. Once applied on the tooth operation chair, the device can offer a sanitary and comfortable feeling to the patients.

Other patents describing the closest subject matter provide for a number of more or less complicated features that fail to solve the problem in an efficient and economical way. None of these patents suggest the novel features of the present invention.

SUMMARY OF THE INVENTION

The instant invention is a disposable armrest cover, comprising a top wall section having a top wall with a forward edge, an aft edge, and first and second lateral edges. The top wall further comprises perforations disposed at a first predetermined distance from the forward edge without reaching the aft edge. A first sidewall section comprises a first sidewall having a first sidewall forward edge, a first sidewall aft edge, and a first sidewall bottom edge. A second sidewall section comprises a second sidewall having a second sidewall forward edge, a second sidewall aft edge, and a second sidewall bottom edge. A forward wall section comprises a forward wall having a bottom edge. A strap assembly secures onto a chair having at least one armrest. In a preferred embodiment, the perforations form an "X" configuration.

The strap assembly comprises first and second straps. Each of the first and second straps comprises a proximal end and a distal end. Each of the proximal ends extend from respective the first and second sidewall bottom edges at a second predetermined distance from respective first and second sidewall forward edges without reaching respective the first and second sidewall aft edges.

The top wall section, the first and second sidewall sections, and the forward wall section form a substantially rectangular box configuration with open aft and bottom sections. The at least one armrest has a cup-receiving hole. The perforations align with the cup-receiving hole. A downward force overcomes the perforations to insert a cup into the cup-receiving hole. The top wall section, the first and second sidewall sections, and the forward wall are made of a flexible, synthetic and impermeable fabric, or a soft surface backed by a polyethylene film that is impervious to liquids. The first and second straps tie to one another and may comprise hook and loop fasteners, or a buckle fastener at the first and second distal ends respectively.

The chair is located in theaters, airplanes, buses, auditoriums, or in public seating areas to prevent or minimize contamination and the spread of viruses, germs, and bacteria.

It is therefore one of the main objects of the present invention to provide a disposable armrest cover that is used on chairs having armrests in theaters, airplanes, buses, auditoriums, and generally any seating having armrests particularly in public seating areas.

It is another object of this invention to provide a disposable armrest cover that prevents contamination and the spread of viruses, germs, and bacteria.

It is another object of this invention to provide a disposable armrest cover that is easy to install and remove.

It is another object of this invention to provide a disposable armrest cover that is volumetrically efficient for carrying, transporting, and storage.

It is another object of this invention to provide a disposable armrest cover that can be readily installed and removed without the need of any special tools.

It is yet another object of this invention to provide such a device that is inexpensive to manufacture while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
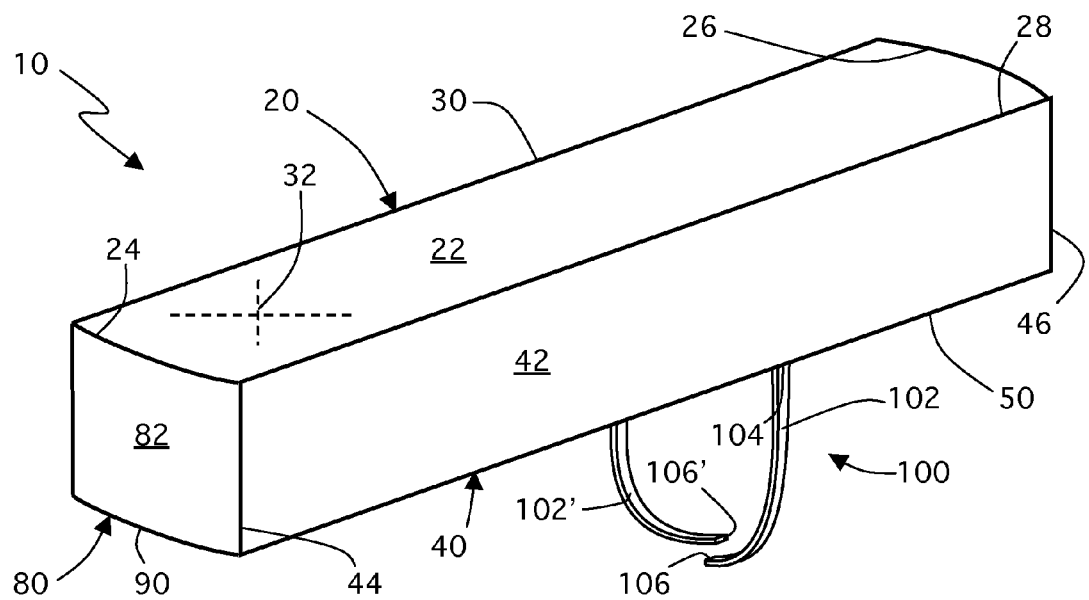
FIG. 1 represents a first isometric view of a disposable armrest cover.

Referring now to the drawings, the present invention is a disposable armrest cover and is generally referred to with numeral 10.

Figure 2:
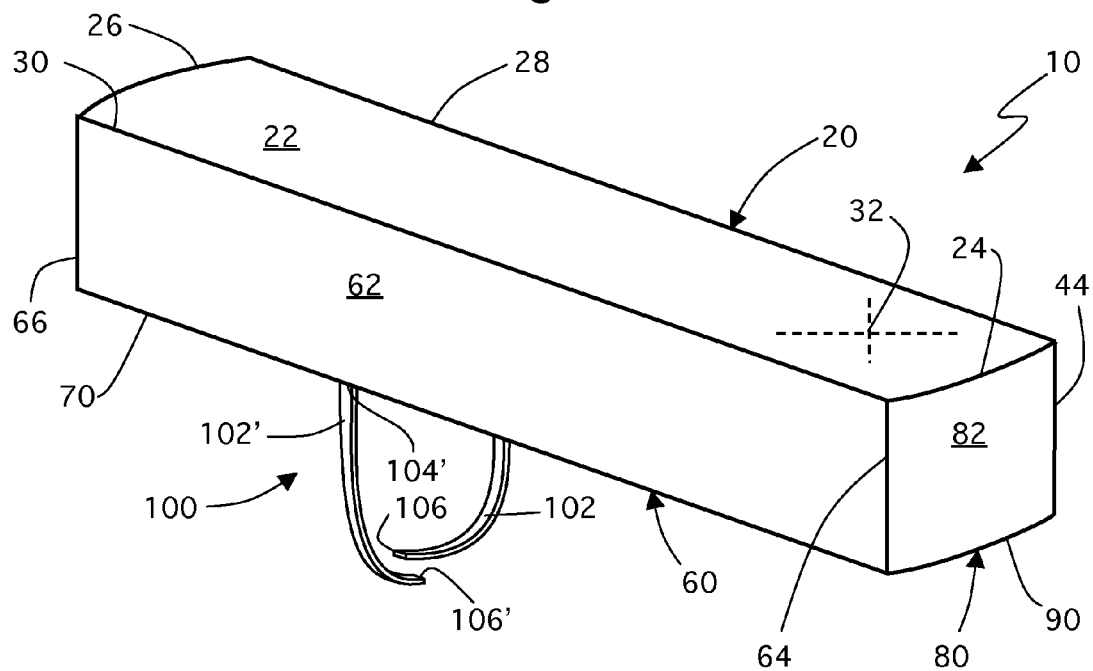
FIG. 2 represents a second isometric view of the disposable armrest cover seen in FIG. 1.

As seen in FIGS. 1 and 2, top wall section 20 comprises top wall 22 having forward edge 24, aft edge 26, and lateral edges 28 and 30. Top wall 22 further comprises perforations 32 disposed at a first predetermined distance from forward edge 24 without reaching aft edge 26. In a preferred embodiment, perforations 32 form an "X" configuration. Sidewall section 40 comprises sidewall 42 having sidewall forward edge 44, sidewall aft edge 46, and sidewall bottom edge 50. Sidewall section 60 comprises sidewall 62 having sidewall forward edge 64, sidewall aft edge 66, and sidewall bottom edge 70. Forward wall section 80 comprises forward wall 82 having bottom edge 90. Strap assembly 100 comprises straps 102 and 102'. Strap 102 has proximal end 104 and distal end 106. Strap 102' has proximal end 104' and distal end 106'. As best seen in FIG. 1, proximal end 104 extends from sidewall bottom edge 50 at a predetermined distance from sidewall forward edge 44 without reaching sidewall aft edge 46. Similarly, as best seen in FIG. 2, proximal end 104' extends from sidewall bottom edge 70 at a predetermined distance from sidewall forward edge 64 without reaching sidewall aft edge 66. Top wall section 20, sidewall sections 40 and 60, and forward wall section 80 form a substantially rectangular box configuration with open aft and bottom sections.

Figure 3:
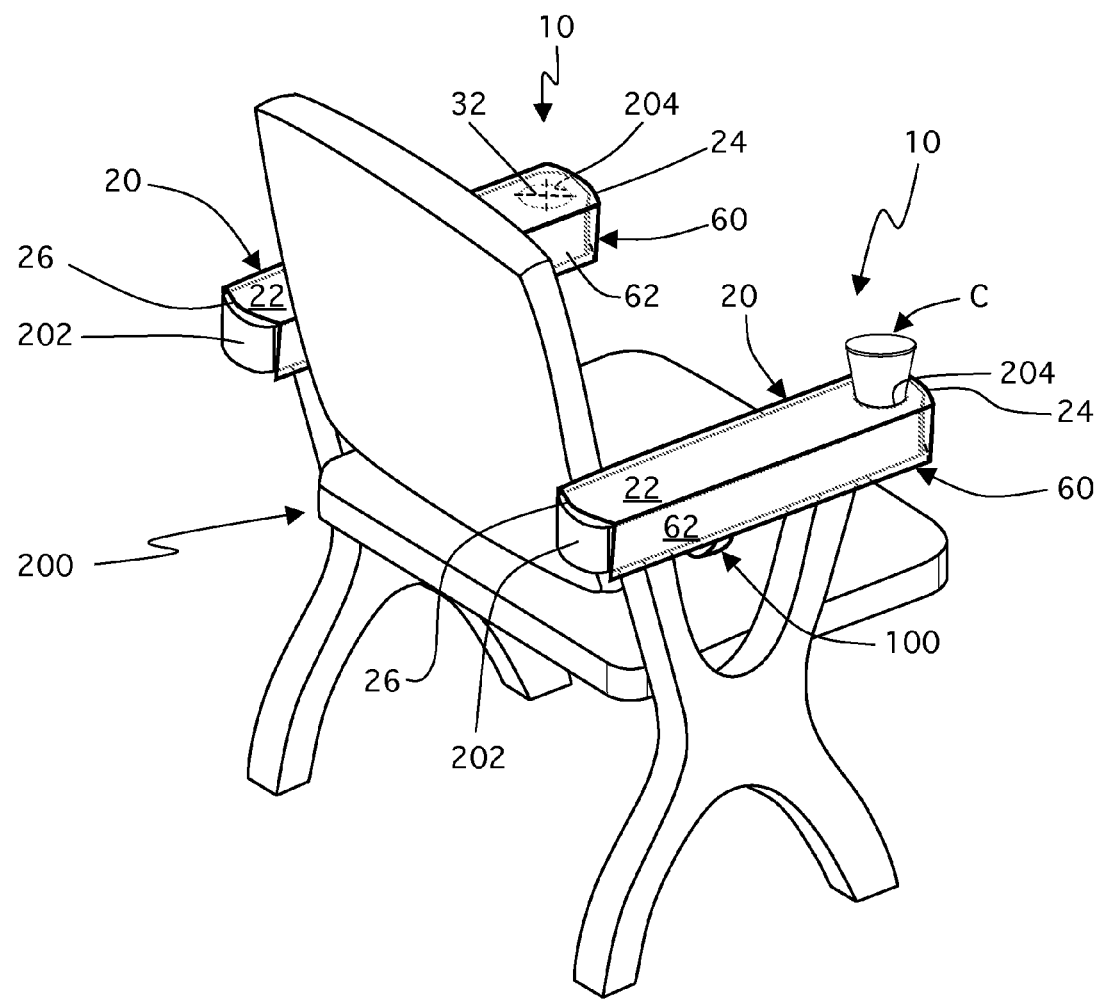
FIG. 3 is an isometric view of a set of disposable armrest covers installed onto a chair having armrests.

As seen in FIG. 3, disposable armrest covers 10 are installed onto respective armrests 202 of chair 200. Straps 102 and 102' secure each disposable armrest cover 10 to a respective armrest 202. In a preferred embodiment, each armrest 202 has a respective cup-receiving hole 204. Perforations 32, at a first predetermined distance from forward edge 24, align with cup receiving hole 204. A user may exert a downward force to overcome perforations 32 and insert cup C into cup receiving hole 204. In a preferred embodiment, disposable armrest cover 10 is made of a flexible, synthetic and impermeable fabric. In an alternate embodiment, disposable armrest cover 10 is made of a soft surface backed by a polyethylene film, whereby it's soft and impervious to liquids.

Figure 4:
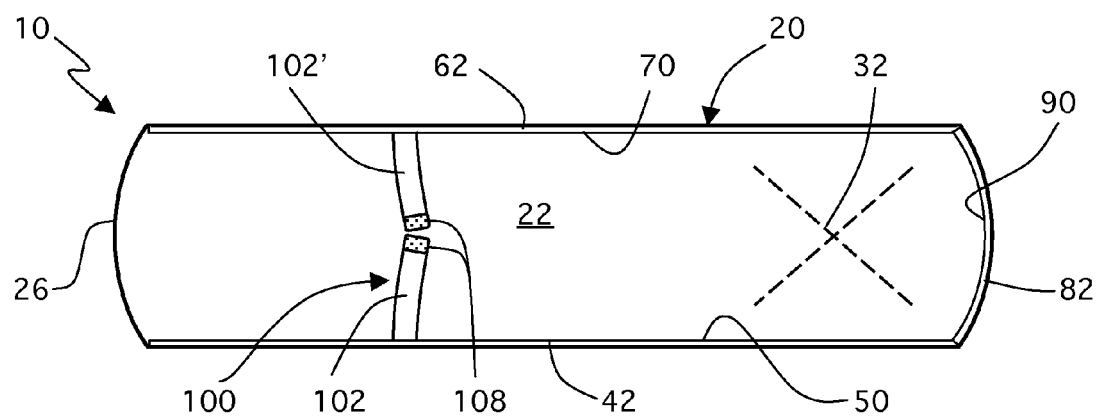
FIG. 4 is a first bottom view of the disposable armrest cover seen in FIG. 1.

As seen in FIG. 4, straps 102 and 102' may be tied or otherwise secured to one another. In a preferred embodiment, strap assembly 100 comprises hook and loop fasteners 108 at distal ends 106 and 106'.

Figure 5:
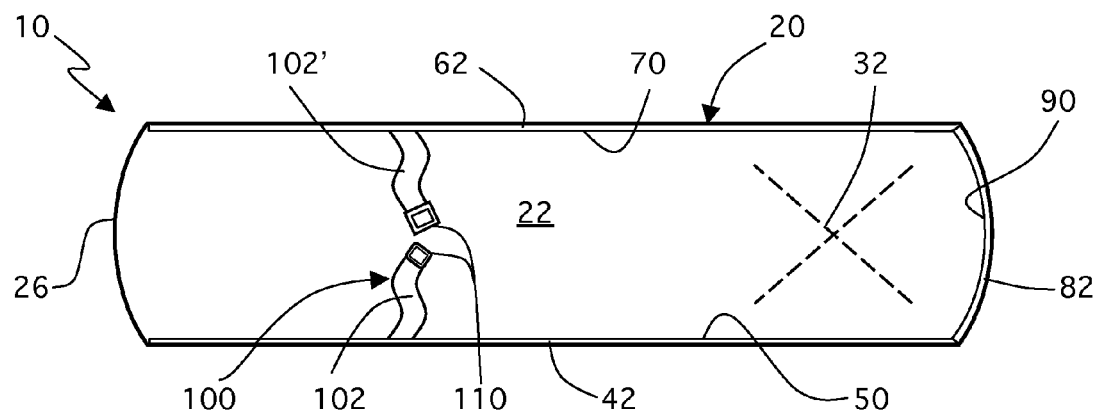
FIG. 5 is a second bottom view of the disposable armrest cover seen in FIG. 1 with an alternate strap assembly embodiment.

As seen in FIG. 5, in an alternate embodiment, strap assembly 100 comprises buckle fastener 110 at distal ends 106 and 106'.

Figure 6:
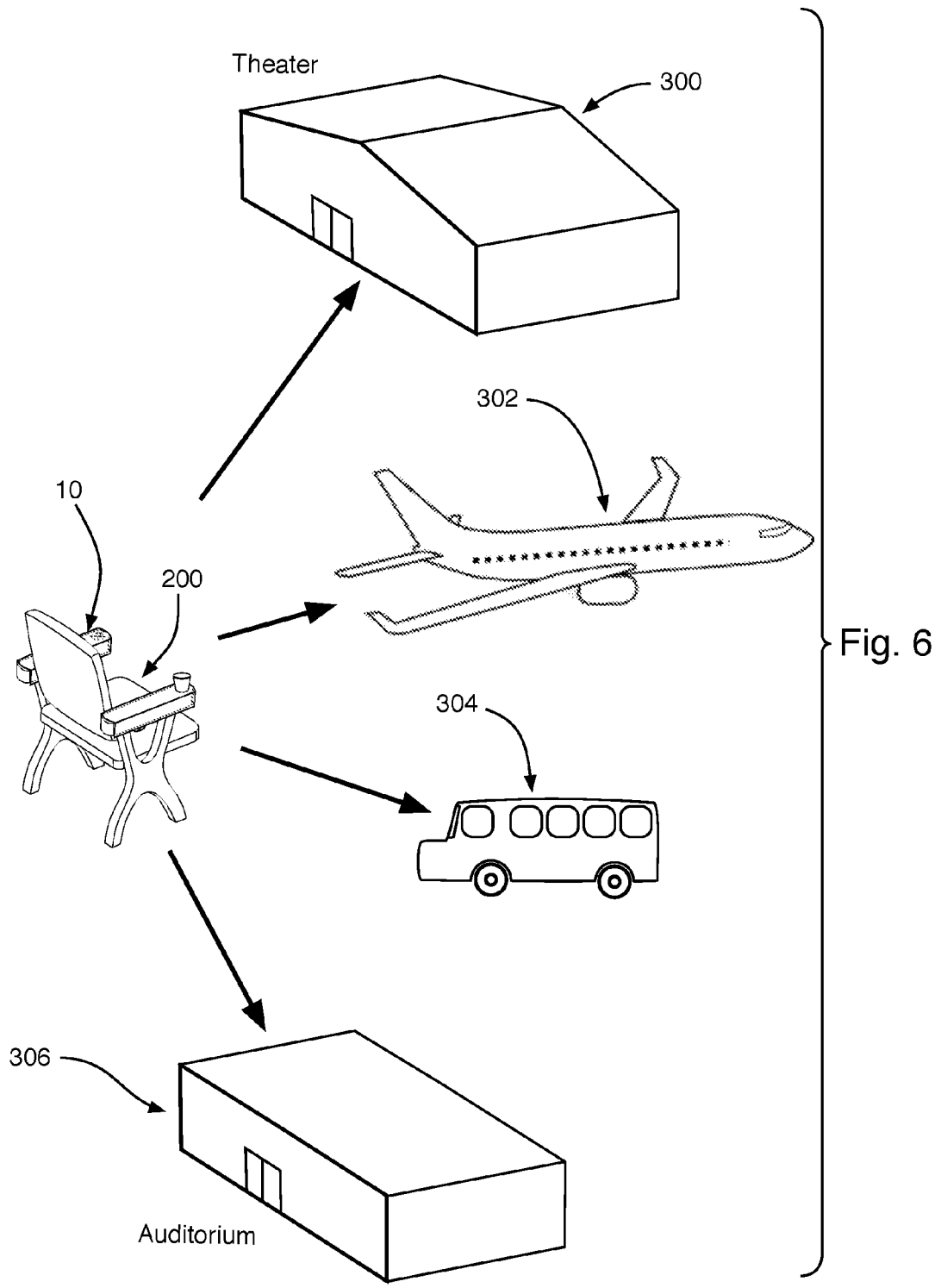
FIG. 6 is a representation of the set of disposable armrest covers installed onto the chair having armrests as seen in FIG. 3 for theaters, airplanes, buses, and auditoriums.

As seen in FIG. 6, disposable armrest covers 10 are used on chairs 200 having armrests 202 in theaters 300, airplanes 302, buses 304, auditoriums 306, and generally any seating having armrests particularly in public seating areas to prevent and/or minimize contamination and the spread of viruses, germs, and bacteria.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A disposable armrest cover, comprising:
   A) a top wall section comprising a top wall having a forward edge, an aft edge, and first and second lateral edges, said top wall further comprises perforations disposed at a first predetermined distance from said forward edge without reaching said aft edge;
   B) a first sidewall section comprising a first sidewall having a first sidewall forward edge, a first sidewall aft edge, and a first sidewall bottom edge;
   C) a second sidewall section comprising a second sidewall having a second sidewall forward edge, a second sidewall aft edge, and a second sidewall bottom edge;
   D) a forward wall section comprising a forward wall having a bottom edge, said top wall section, said first and second sidewall sections, and said forward wall section forming a substantially rectangular box configuration with open aft and bottom sections; and E) a strap assembly to secure onto a chair having at least one armrest.

2. The disposable armrest cover set forth in claim 1, wherein said perforations form an "X" configuration.

3. The disposable armrest cover set forth in claim 1, wherein said strap assembly comprises first and second straps.

4. The disposable armrest cover set forth in claim 3, wherein each of said first and second straps comprises a proximal end and a distal end.

5. The disposable armrest cover set forth in claim 4, wherein each of said proximal end extends from respective said first and second sidewall bottom edges.

6. The disposable armrest cover set forth in claim 4, wherein each of said proximal end extends from respective said first and second sidewall bottom edges at a second predetermined distance from respective said first and second sidewall forward edges without reaching respective said first and second sidewall aft edges.

7. The disposable armrest cover set forth in claim 4, wherein said first and second straps comprise hook and loop fasteners at said first and second distal ends respectively.

8. The disposable armrest cover set forth in claim 4, wherein said first and second straps comprise a buckle fastener at said first and second distal ends respectively.

9. The disposable armrest cover set forth in claim 3, wherein said first and second straps tie to one another.

10. The disposable armrest cover set forth in claim 1, wherein said at least one armrest has a cup-receiving hole.

11. The disposable armrest cover set forth in claim 10, wherein said perforations align with said cup-receiving hole.

12. The disposable armrest cover set forth in claim 11, wherein a downward force overcomes said perforations to insert a cup into said cup receiving hole.

13. The disposable armrest cover set forth in claim 1, wherein said top wall section, said first and second sidewall sections, and said forward wall are made of a flexible, synthetic and impermeable fabric.

14. The disposable armrest cover set forth in claim 1, wherein said top wall section, said first and second sidewall sections, and said forward wall are made of a soft surface backed by a polyethylene film that is impervious to liquids.

15. The disposable armrest cover set forth in claim 1, wherein said chair is located in theaters, airplanes, buses, or auditoriums to prevent or minimize contamination and the spread of viruses, germs, and bacteria.

16. The disposable armrest cover set forth in claim 1, wherein said chair is located in public seating areas to prevent or minimize contamination and the spread of viruses, germs, and bacteria.

* * * * *